United States Patent [19]
Escudero

[11] 3,773,137
[45] Nov. 20, 1973

[54] SAFETY STEERING GEAR FOR AUTOMOTIVE VEHICLES

[76] Inventor: Angel Navarro Escudero, calle San Juan, No. 94, Gava (Barcelona), Spain

[22] Filed: June 21, 1971

[21] Appl. No.: 155,040

[30] Foreign Application Priority Data
June 19, 1970 Spain .................................. 159569

[52] U.S. Cl. .................. 180/103, 74/493, 340/52 R
[51] Int. Cl. ............................................. B60k 27/08
[58] Field of Search ........................ 340/52; 74/493; 280/150 B; 180/78, 79, 82 R, 82.3, 103

[56] References Cited
UNITED STATES PATENTS
1,225,289   5/1917   Twombly .............................. 74/493
1,791,001   2/1931   Rasmussen ........................... 74/493
2,639,626   5/1953   Snyder ................................. 74/493
3,435,700   4/1969   Calhoan ............................... 74/493
2,254,640   9/1941   Baker ................................... 74/493

FOREIGN PATENTS OR APPLICATIONS
653,047   10/1928   France ................................. 74/493

Primary Examiner—Kenneth N. Leimer
Attorney—William C. Linton et al.

[57] ABSTRACT

A safety steering column having a telescopic two section shaft with a ferrule slideable on one of said sections and detachably connected to the other section for movement therewith to operate a motor cut-off switch and including a detachable pin for disconnecting said sections when desired as an anti-theft device.

3 Claims, 2 Drawing Figures

PATENTED NOV 20 1973  3,773,137

SAFETY STEERING GEAR FOR AUTOMOTIVE VEHICLES

The present invention refers to a safety steering gear for automotive vehicles, the characteristics of which are sufficiently specified in the description which follows.

The hazard which the head-on collision represents for the driver of a vehicle is known, since his entire body, on being thrown forward, impinges on the steering wheel, causing serious injuries by the impact of the thorax and abdomen thereon.

For this reason, the possibility of reducing as much as possible the violence of the impact will be an adequate solution, especially if this is achieved by a device which, without disregard of the good handling of the vehicle, permits the regression of the steering wheel and its shaft, on being pushed by the driver's body.

The main characteristic of the object of this invention having been specified, there is shown, in the annexed drawing, a graphic representation thereof, to which we shall refer in the rest of the description, given by way of non-limitative example.

Figure 1:
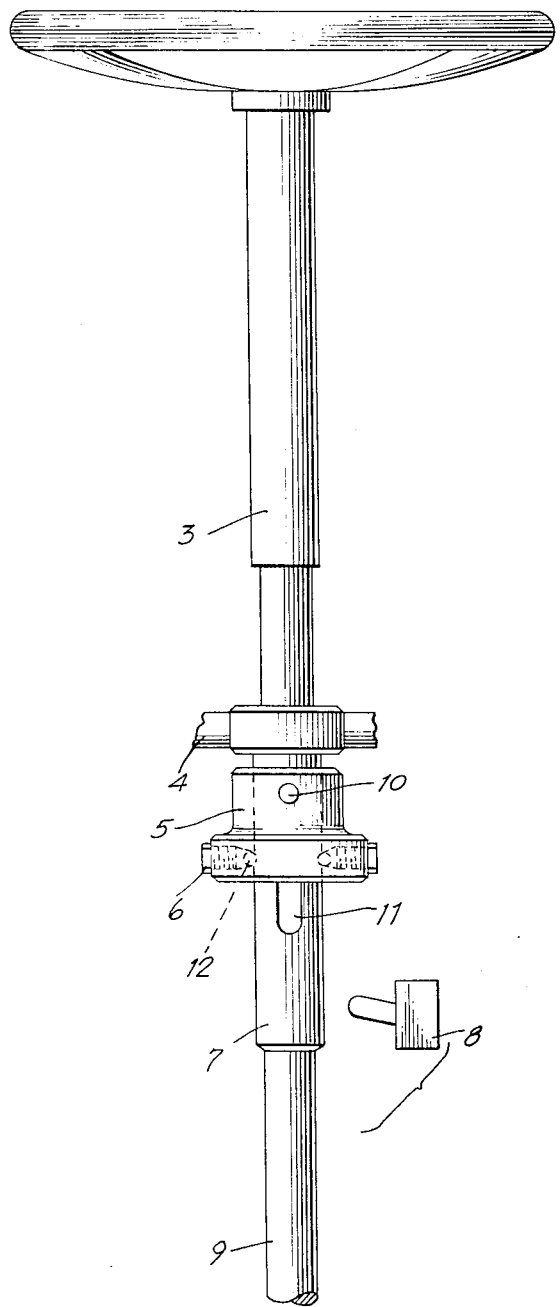
Figure 2:
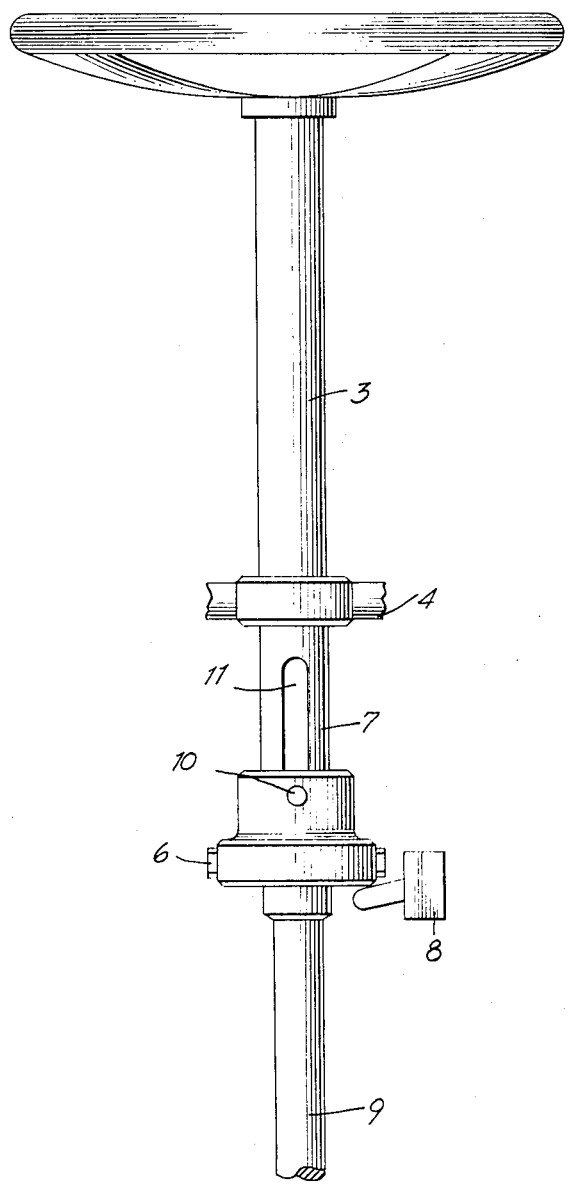

In said drawing, FIG. 1 shows a schematic detail of the steering wheel in its normal position, while FIG. 2 shows the same in regressive position, under the effect of an external pressure.

Following the drawings, one observes the steering wheel and shaft 3, held by the ferrule 4 which, by suitable flanges, is fixed to the frame of the vehicle.

On said steering shaft 3 is fixed a sliding ferrule 5, both being joined by the pin 10, through the continuous orifice 11, in the sleeve 7.

Said seeve is integral with the steering bar 9, which extends up to the steering box not shown in the figures.

The pressure on the steering wheel causes the shaft 3 to descend, and the ferrule 5 slides on the sleeve 7, disengaging itself from the slight and sufficient pressure exerted by the springs 6 and balls 12, on the respective positional notches which said sleeve 7 has.

As the ferrule 5 descends, it actuates the switch 8, causing the stopping of the motor and cutting of the electric contact, as well as the setting off of optional acoustic and luminous alarm devices.

Likewise, and as a safety measure, the driver can, on leaving the vehicle, take off the pin 10, so that the shaft 3 will be loose, without possiblity of actuating its complement 9, this being equivalent to an effective anti-theft device.

The object of the invention having been sufficiently described, it should be noted that on being carried into effect, the forms, dimensions, proportion and arrangement of the different elements, as well as the materials used, may vary, without thereby altering or modifying its essence.

I claim:

1. A safety steering column for automotive vehicles, comprising a steering bar having a sleeve portion extending longitudinally from one end thereof and a longitudinally extending slot through said sleeve, a steering shaft having an end portion slideably extending in said sleeve, a ferrule slideably mounted on said sleeve, a pin extending through said ferrule, said sleeve slot and into said steering shaft end portion whereby longitudinal movement of said steering shaft end portion in said sleeve will move said ferrule along said sleeve and a motor cut-off switch positioned for being engaged and moved to its off position by said ferrule on movement of said steering shaft end portion into said sleeve.

2. A safety steering shaft for automotive vehicles as claimed in claim 1 including spring pressed balls in said ferrule and notches in said sleeve for detachably receiving said balls and retaining said steering shaft in its driving position.

3. A safety steering column for automotive vehicles as claimed in claim 1 wherein said pin is detachably inserted through said ferrule, sleeve slot and steering shaft end portion whereby removal of said pin frees said steering shaft from said steering bar providing an anti-theft device.

* * * * *